United States Patent
Koara

(10) Patent No.: US 9,218,492 B2
(45) Date of Patent: Dec. 22, 2015

(54) PROGRAMMABLE DISPLAY

(75) Inventor: Kengo Koara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/237,640

(22) PCT Filed: Sep. 9, 2011

(86) PCT No.: PCT/JP2011/070645
§ 371 (c)(1),
(2), (4) Date: Feb. 7, 2014

(87) PCT Pub. No.: WO2013/035203
PCT Pub. Date: Mar. 14, 2013

(65) Prior Publication Data
US 2014/0223571 A1 Aug. 7, 2014

(51) Int. Cl.
*G06F 21/00* (2013.01)
*G06F 21/60* (2013.01)
*G05B 19/048* (2006.01)
*G06F 15/00* (2006.01)
(Continued)

(52) U.S. Cl.
CPC ............. *G06F 21/60* (2013.01); *G05B 19/048* (2013.01); *G05B 19/409* (2013.01); *G06F 15/00* (2013.01); *G09G 5/00* (2013.01)

(58) Field of Classification Search
CPC ....... G06F 21/60; G06F 15/00; G05B 19/409; G05B 19/048; G09G 5/00
USPC .................................. 726/2, 26, 27
See application file for complete search history.

(56) References Cited

U.S. PATENT DOCUMENTS

| | | | | |
|---|---|---|---|---|
| 6,023,765 A | * | 2/2000 | Kuhn | 726/4 |
| 8,881,240 B1 | * | 11/2014 | Malik et al. | 726/4 |
| 2003/0236979 A1 | * | 12/2003 | Himmel et al. | 713/167 |

(Continued)

FOREIGN PATENT DOCUMENTS

| | | |
|---|---|---|
| JP | 11-312013 A | 11/1999 |
| JP | 11-312099 A | 11/1999 |

(Continued)

OTHER PUBLICATIONS

International Search Report, PCT/JP2011/070645, dated Dec. 13, 2011.

(Continued)

*Primary Examiner* — Sarah Su
(74) *Attorney, Agent, or Firm* — Sughrue Mion, PLLC; Richard C. Turner

(57) ABSTRACT

A programmable display that is connected to a control apparatus controlling apparatuses and that functions as a user interface for the control apparatus, includes a display processing unit displaying, on a display unit, a screen and display objects arranged in the screen; and a storing unit storing, concerning each of a candidate screen, which is a candidate of the screen, and a candidate display object, which is a candidate of the display objects, setting security level information for specifying a level to which the candidate screen or the candidate display object belongs among levels obtained by ranking security in a horizontal division manner and setting security group information for specifying a group to which the candidate screen or the candidate display object belongs among groups obtained by dividing security in a vertical division manner over the levels.

13 Claims, 10 Drawing Sheets

(51) Int. Cl.
*G09G 5/00* (2006.01)
*G05B 19/409* (2006.01)

(56) References Cited

U.S. PATENT DOCUMENTS

| | | | |
|---|---|---|---|
| 2005/0198324 A1* | 9/2005 | Silva | 709/229 |
| 2005/0278365 A1* | 12/2005 | Boucousis | 707/100 |
| 2005/0283823 A1* | 12/2005 | Okajo et al. | 726/1 |
| 2006/0221067 A1* | 10/2006 | Kim et al. | G06F 21/84 345/204 |
| 2006/0230281 A1* | 10/2006 | Hofmann | 713/182 |
| 2007/0094711 A1* | 4/2007 | Corley et al. | 726/3 |
| 2008/0314969 A1* | 12/2008 | Hussey | 235/375 |
| 2009/0260086 A1* | 10/2009 | Lang et al. | 726/25 |
| 2011/0191303 A1* | 8/2011 | Kaufman et al. | 707/684 |
| 2013/0346842 A1* | 12/2013 | Koara | 715/211 |
| 2014/0059545 A1* | 2/2014 | Flake et al. | 718/1 |
| 2014/0181964 A1* | 6/2014 | Park et al. | 726/19 |
| 2015/0084976 A1* | 3/2015 | Guo et al. | G06F 1/1647 345/589 |

FOREIGN PATENT DOCUMENTS

| | | |
|---|---|---|
| JP | 2002-328706 A | 11/2002 |
| JP | 2004-171283 A | 6/2004 |
| WO | 2009/147855 A1 | 12/2009 |

OTHER PUBLICATIONS

Japanese Office Action, 2012-505909, dated Mar. 28, 2012.
Taiwanese Office Action, issued Mar. 3, 2014, Application No. 100146420.
Communication dated Jan. 16, 2015, issued by the State Intellectual Property Office of the People's Republic of China in counterpart Application No. 201180073294.5.

* cited by examiner

FIG.3
(a) 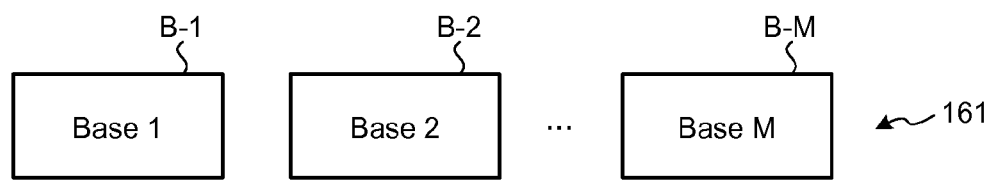
(b) 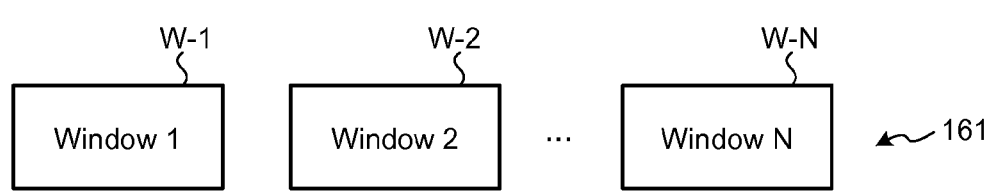
(c) 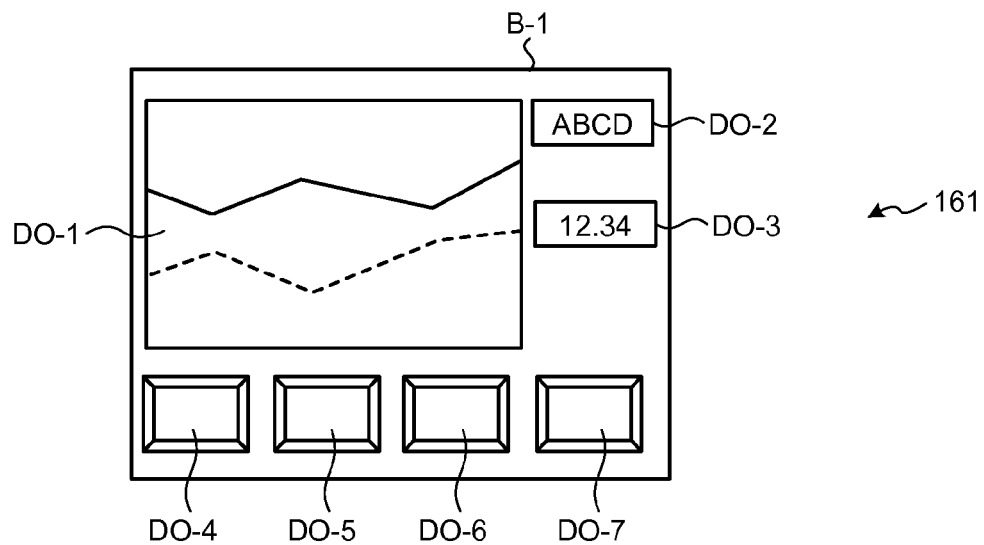

TABLE 1  SECURITY SETTING EXAMPLE FOR BASE SCREEN

|  | B-1 | B-2 | B-3 | ... | B-M |
|---|---|---|---|---|---|
| SETTING SECURITY LEVEL | 0 | 10 | 10 | ... | 5 |
| SETTING SECURITY GROUP | 0 | 1 | 2 | ... | 3 |

↙ 162, 163

(b)

TABLE 2  SECURITY SETTING EXAMPLE FOR WINDOW SCREEN

|  | W-1 | W-2 | W-3 | ... | W-N |
|---|---|---|---|---|---|
| SETTING SECURITY LEVEL | 1 | 3 | 5 | ... | 10 |
| SETTING SECURITY GROUP | 0 | 1 | 1 | ... | 2 |

↙ 162, 163

(c)

TABLE 3  SETTING EXAMPLE OF DISPLAY SECURITY FOR DISPLAY OBJECT

DISPLAY SECURITY

|  | DO-1 | DO-2 | DO-3 | DO-4 | DO-5 | DO-6 | DO-7 |
|---|---|---|---|---|---|---|---|
| SETTING SECURITY LEVEL | 0 | 0 | 0 | 3 | 3 | 3 | 5 |
| SETTING SECURITY GROUP | 0 | 1 | 2 | 0 | 1 | 2 | 2 |

↙ 162, 163

(d)

TABLE 4  SETTING EXAMPLE OF OPERATION SECURITY FOR DISPLAY OBJECT

OPERATION SECURITY

|  | DO-1 | DO-2 | DO-3 | DO-4 | DO-5 | DO-6 | DO-7 |
|---|---|---|---|---|---|---|---|
| SETTING SECURITY LEVEL | - | 3 | 3 | 5 | 5 | 5 | 5 |
| SETTING SECURITY GROUP | - | 1 | 2 | 0 | 2 | 2 | 3 |

↙ 162, 163

| OPERATOR ID | PASSWORD | SECURITY LEVEL | SECURITY GROUP |
|---|---|---|---|
| ADMINISTRATOR | Abc123!"# | 15 | 1, 2, 3, 4 |
| LINE A GROUP LEADER | B$"#abd% | 5 | 1 |
| LINE A WORKER | 123zxddjwe | 1 | 1 |
| LINE B GROUP LEADER | $#j4l39AC | 5 | 2 |
| LINE B WORKER | G"#j2kBSAa | 1 | 2 |
| ⋮ | ⋮ | ⋮ | ⋮ |

FIG.10

| PRESENT SECURITY GROUP (OPERATION SECURITY GROUP) | 0 | 5 | 10 |
|---|---|---|---|
| SETTING SECURITY GROUP DISPLAY=5/OPERATION=10 | NON-DISPLAY | DISPLAY (OPERATION IMPOSSIBLE) | DISPLAY (OPERATION POSSIBLE) |
| SETTING SECURITY GROUP DISPLAY=0 (ALL)/OPERATION=5 | DISPLAY (OPERATION IMPOSSIBLE) | DISPLAY (OPERATION POSSIBLE) | DISPLAY (OPERATION IMPOSSIBLE) |

FIG.11

| PRESENT SECURITY GROUP (OPERATION SECURITY GROUP) | 0 | 5 | 5, 10 |
|---|---|---|---|
| SETTING SECURITY GROUP DISPLAY=5/OPERATION=5 | NON-DISPLAY | DISPLAY (OPERATION POSSIBLE) | DISPLAY (OPERATION POSSIBLE) |
| SETTING SECURITY GROUP DISPLAY=0/OPERATION=10 | DISPLAY (OPERATION IMPOSSIBLE) | DISPLAY (OPERATION IMPOSSIBLE) | DISPLAY (OPERATION POSSIBLE) |

PROGRAMMABLE DISPLAY

CROSS REFERENCE TO RELATED APPLICATIONS

This application is a National Stage of International Application No. PCT/JP2011/070645 filed Sep. 9, 2011, the contents of all of which are incorporated herein by reference in their entirety.

FIELD

The present invention relates to a programmable display.

BACKGROUND

Patent Literature 1 describes that, in a monitor apparatus with an input unit in a production and assembly system, a display-switching-security control unit reads out screen data, in which a security setting value is described and set for each of display parts, reads out a device value (a security level value) set in a programmable controller (PC), compares the security level value and the security setting value, and performs, based on a comparison result, a switching instruction for display/non-display of the display parts for each of the display parts. Consequently, according to Patent Literature 1, when the screen data is displayed, display/non-display of the display parts is performed for each of the display parts based on the comparison result. Therefore, it is possible to display only necessary characters and numerical values on the screen in one image data only through security setting.

Patent Literature 2 describes that, in a monitoring control apparatus that performs monitoring control on a plurality of apparatuses that are subject to monitoring control, an operation-execution-right-determination processing unit receives an input operator name and an input password, retrieves, based on the operator name and the password, an operator group, to which an operator belongs, from a person-in-charge group table, further retrieves a function group, an execution right for which is permitted to the operator group, from a security table A, stores a retrieval result on a memory as execution propriety information, retrieves an apparatus group, an execution right of which is permitted to the operator group, from a security group B, and stores a retrieval result on the memory as execution propriety information. Consequently, according to Patent Literature 2, propriety of execution by the operator is discriminated with reference to the execution propriety information stored in the memory. Therefore, it is possible to give flexibility to configuration contents of a security function.

Patent Literature 3 describes that, in a programmable display, a key-information control unit recognizes connection of a hardware key, in which information concerning an operator is stored, to the programmable display and a CPU acquires the information concerning the operator from the hardware key, compares the information concerning the operator with list information stored in a key-list storing unit, and, when the information concerning the operator is included in the list information, instructs a graphic controller to perform display control. Consequently, according to Patent Literature 3, it is possible to control a display operation of a display screen corresponding to the operator by connecting the hardware key. Therefore, it is unnecessary to apply access control by a password input as in the conventional technology. Thus, a situation such as a leakage of passwords does not occur.

CITATION LIST

Patent Literature

Patent Literature 1: Japanese Patent Application Laid-open No. H11-312013
Patent Literature 2: Japanese Patent Application Laid-open No. H11-312099
Patent Literature 3: Japanese Patent Application Laid-open No. 2004-171283

SUMMARY

Technical Problem

The technology described in Patent Literature 1 only controls display/non-display of the display parts according to a security level. The technology cannot deal with a use case in which management of security is difficult only with the security level.

As the use case in which management of security is difficult only with the security level, for example, a use case is conceivable in which a programmable display that monitors lines of a factory and has a role of monitoring and operating two lines such as a line A and a line B is commonly used by group leaders and workers of the respective lines A and B. In this use case, it is conceivable that there is a demand that the group leaders and the workers are present independently for the respective lines A and B, the group leaders and the workers can perform viewing and operation concerning the lines that the group leaders and the workers are in charge of, and setting operation, which the workers cannot perform, is desired to be permitted to the group leaders. In this use case, for example, when the same security level is allocated to the group leader of the line A and the group leader of the line B, the group leader of the line B can monitor not only the line B but also the line A. Therefore, the above demand cannot be satisfied. That is, management of security is difficult only with the security level.

In the technology described in Patent Literature 2, the function group, the execution right of which is permitted to the operator group, appears. However, a setting unit in the "functional group table" for setting the function group is a unit of function for operating the apparatus. In Patent Literature 2, there is no description concerning display control and there is no description concerning a security level either. That is, the technology described in Patent Literature 2 is only a technology for performing control concerning operation of which function of which apparatus is permitted to each of operators. The technology is unsuitable for a method in which it is desired to arrange a large number of display objects in screens as in a programmable display and manage authority of security for each of the screens or each of the display objects.

In the technology described in Patent Literature 3, a level of a group and a level of security are illustrated as the information concerning the operator. However, the "level of a group" in Patent Literature 3 is considered to be only a horizontal division concept called "level" and only the same concept as the "level of security". That is, in the technology described in Patent Literature 3 also, the technology cannot deal with a use case in which management of security is difficult only with the security level.

The present invention has been achieved in view of the above and it is an object of the present invention to obtain a programmable display suitable for not only ranking security in a horizontal division manner for each of a screen and a display object that should be displayed on a display unit and managing the security but also grouping the security in a vertical division manner and managing the security.

Solution to Problem

In order to solve the above problems and achieve the object, the present invention, a programmable display according to one aspect of the present invention is a programmable display that is connected to a control apparatus controlling a plurality of apparatuses and that functions as a user interface for the control apparatus, including a display processing unit that displays, on a display unit, a screen and a plurality of display objects arranged in the screen; and a storing unit that stores, concerning each of a candidate screen, which is a candidate of the screen and a candidate display object, which is a candidate of the display objects, setting security level information for specifying a level to which the candidate screen or the candidate display object belongs among a plurality of levels obtained by ranking security in a horizontal division manner and setting security group information for specifying a group to which the candidate screen or the candidate display object belongs among a plurality of groups obtained by dividing security in a vertical division manner over the levels.

Advantageous Effects of Invention

According to the present invention, because the setting security level information and the setting security group information are stored, it is possible to provide a programmable display suitable for not only ranking security in a horizontal division manner for each of a screen and a display object that should be displayed on a display unit and managing the security but also grouping the security in a vertical division manner and managing the security.

BRIEF DESCRIPTION OF DRAWINGS

FIG. 3 is a diagram of candidate screens and candidate display objects in the embodiment.

FIG. 5 is a diagram of the configurations of setting security level information and setting security group information in the embodiment.

FIG. 10 is a diagram of the operation of a display unit according to the embodiment.

FIG. 11 is a diagram of the operation of the display unit according to the embodiment.

DESCRIPTION OF EMBODIMENTS

An embodiment of a programmable display according to the present invention is explained in detail below based on the drawings. The present invention is not limited by the embodiment.

Embodiment

Figure 1:
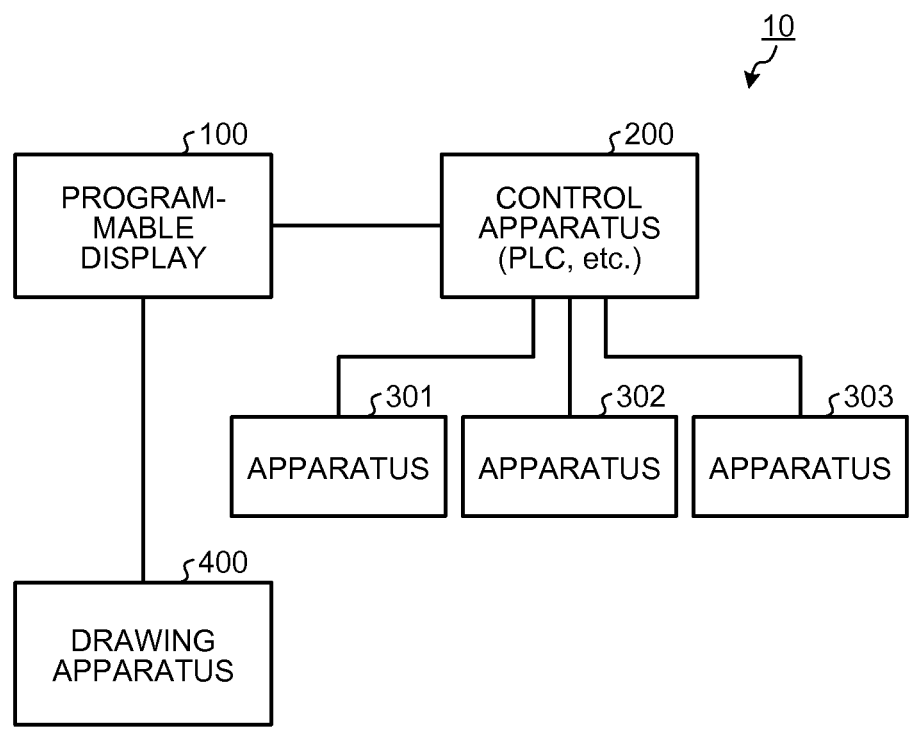
FIG. 1 is a diagram of the configuration of a system to which a programmable display according to an embodiment is applied.

The schematic configuration of a control system 10 to which a programmable display 100 according to an embodiment is applied is explained with reference to FIG. 1. FIG. 1 is a diagram of the schematic configuration of the control system 10.

The control system 10 is a control system used for control of a plurality of apparatuses. The control system 10 includes a drawing apparatus 400, the programmable display 100, a control apparatus 200, and a plurality of apparatuses 301 to 303. In this specification, an operator means a person who operates the programmable display 100. In this specification, a user means a screen designer who designs a screen of the programmable display 100 via the drawing apparatus 400.

The drawing apparatus 400 is connected to the programmable display 100. The drawing apparatus 400 creates, according to operation from the user, drawing data, which is design data of a screen that should be displayed on the programmable display 100. The drawing apparatus 400 supplies the drawing data to the programmable display 100.

The programmable display 100 is connected to the drawing apparatus 400 and the control apparatus 200. The programmable display 100 displays, according to the drawing data received from the drawing apparatus 400, a screen designed by the drawing apparatus 400 on a display screen of the programmable display 100. The programmable display 100 receives operation from the operator via the display screen and, according to the operation from the operator, reads out data stored in the control apparatus 200 or rewrites data stored in the control apparatus 200. That is, the programmable display 100 functions as a user interface for the control apparatus 200.

The control apparatus 200 is connected to the programmable display 100 and the apparatuses 301 to 303. The control apparatus 200 is, for example, a PLC (Programmable Logic Controller) and controls the apparatuses 301 to 303.

Figure 2:
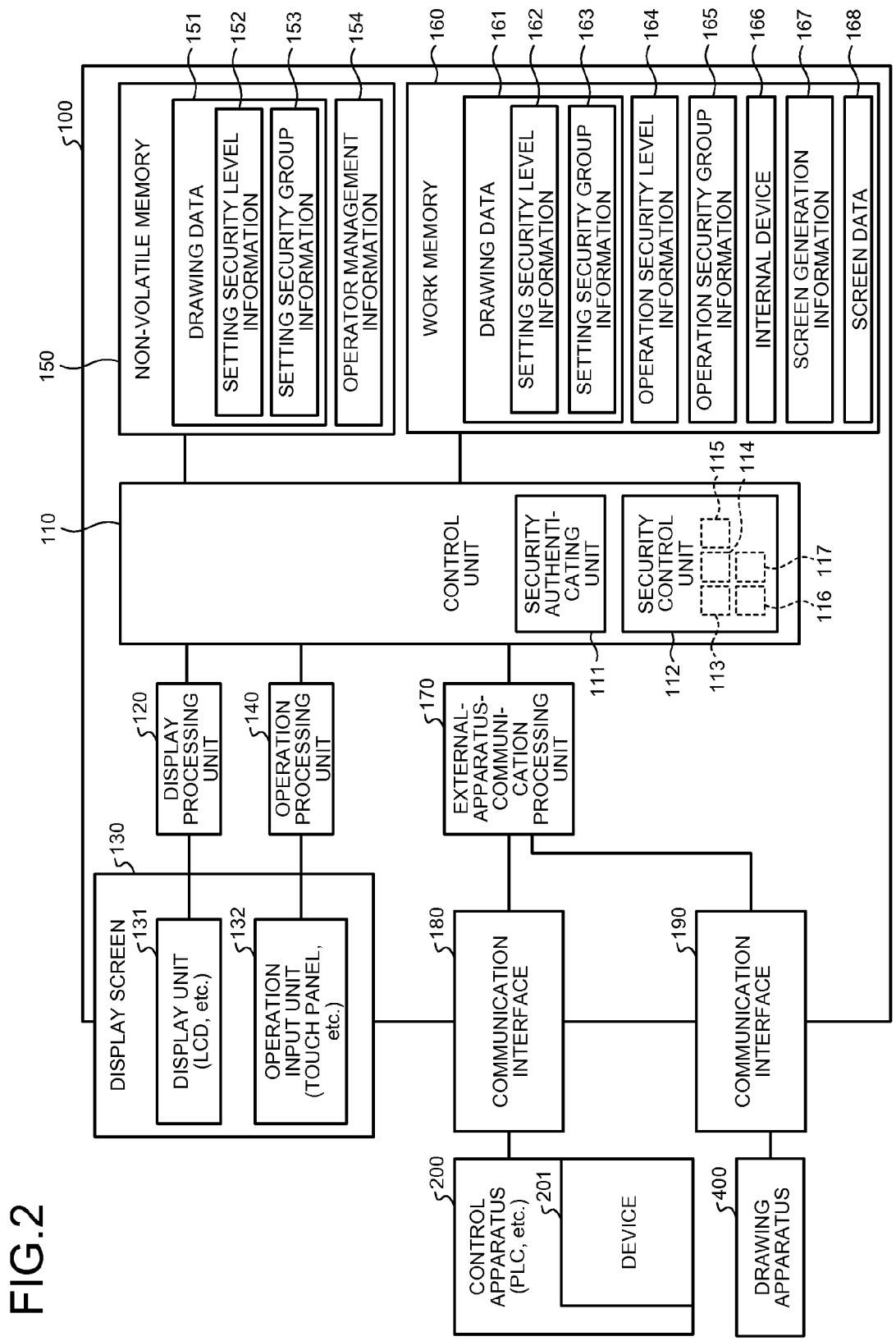
FIG. 2 is a diagram of the configuration of the programmable display according to the embodiment.

Next, the internal configuration of the programmable display 100 will be explained with reference to FIG. 2.

The programmable display 100 includes a control unit 110, a display processing unit 120, a display screen 130, an operation processing unit 140, a non-volatile memory (storing unit) 150, a work memory (storing unit) 160, an external-apparatus-communication processing unit 170, a communication interface 180, and a communication interface 190.

The control unit 110 comprehensively controls the units of the programmable display 100. The external-apparatus-communication processing unit 170 receives, via the communication interface 190, drawing data transmitted from the drawing apparatus 400 and temporarily stores the received drawing data 151 in the non-volatile memory 150. The non-volatile memory 150 is, for example, a Flash ROM. The control unit 110 reads out the drawing data 151 from the non-volatile memory 150 as appropriate and stores read-out drawing data 161 in the work memory 160. The work memory 160 is a storage device (e.g., a memory such as a RAM) for the user (a screen designer) to freely store and refer to values. The work memory 160 stores drawing data 161 created by the user (the screen designer) via the drawing apparatus 400.

In the non-volatile memory 150, operator management information 154 (see FIG. 6) is stored in addition to the drawing data 151. In the work memory 160, an internal device 166 is stored in addition to the drawing data 161.

The drawing data 151 and 161 are data including the same contents each other. The drawing data 151 and 161 include a plurality of candidate screens B-1 to B-M and W-1 to W-N (see FIG. 3), a plurality of candidate display objects DO-1 to DO-7 (see FIG. 3), setting security level information 152 and 162 (see FIG. 5), and setting security group information 153 and 163 (see FIG. 5).

Each of the candidate screens B-1 to B-M and W-1 to W-N is created in advance by the user in the drawing apparatus 400 as a candidate of a screen to be displayed (see FIG. 3).

Each of the candidate display objects DO-1 to DO-7 is created in advance by the user in the drawing apparatus 400 as a candidate of a display object to be arranged and displayed in the screens (the candidate screens B-1 to B-M and W-1 to W-N) (see FIG. 3). That is, the display objects are associated in advance with one or more candidate screens B-1 to B-M and W-1 to W-N corresponding thereto to be arranged in the candidate screens B-1 to B-M and W-1 to W-N.

Figure 4:
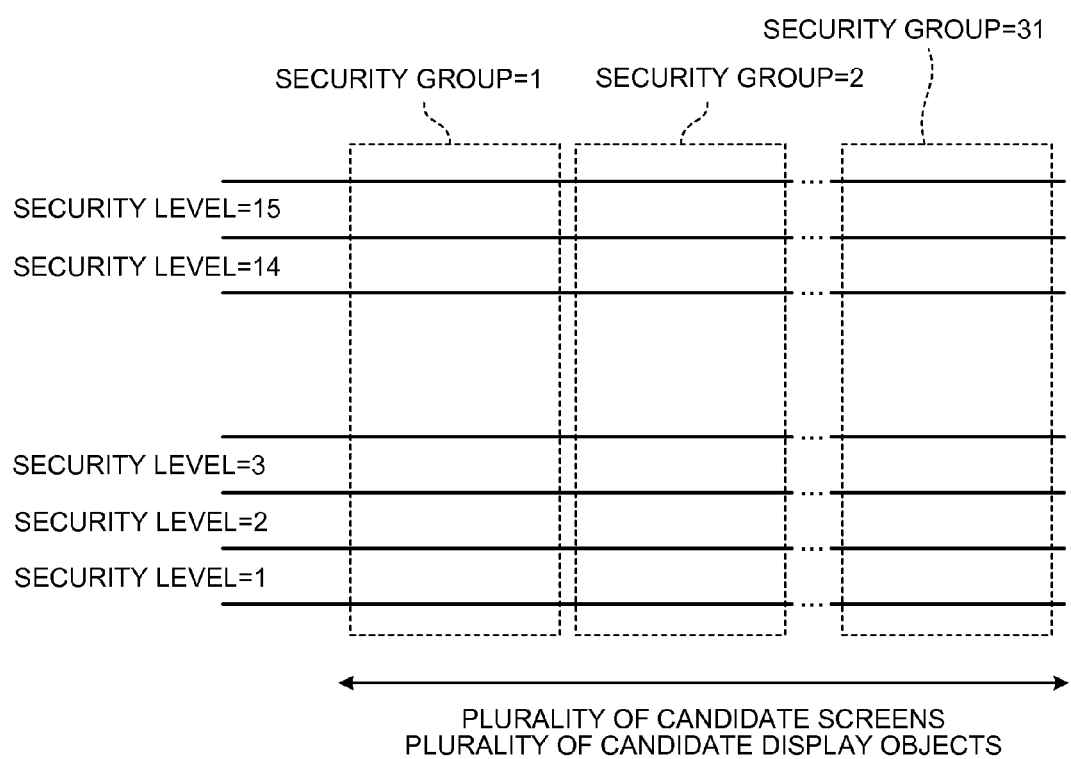
FIG. 4 is a conceptual diagram showing a relation between security levels and security groups in the embodiment.

The setting security level information 152 and 162 is information set in advance by the user in the drawing apparatus 400 concerning each of the candidate screens B-1 to B-M and W-1 to W-N and the candidate display objects DO-1 to DO-7 as information for specifying a level (a security level) to which the candidate screen or the candidate display object belongs among a plurality of levels obtained by ranking security in a horizontal division manner (see FIG. 4). For example, the setting security level information 152 and 162 includes information in which identifiers of candidate screens and security levels to which the candidate screens belong are associated with each other concerning the candidate screens B-1 to B-M and W-1 to W-N (see FIGS. 5(a) and 5(b)). Alternatively, for example, the setting security level information 152 and 162 includes information in which identifiers of candidate display objects and security levels to which the candidate display objects belong are associated with each other concerning the candidate display objects DO-1 to DO-7 (see FIGS. 5(c) and 5(d)). The setting security level information 152 and 162 concerning the candidate screens B-1 to B-M and W-1 to W-N includes security levels concerning display security. On the other hand, the setting security level information 152 and 162 concerning the candidate display objects DO-1 to DO-7 includes security levels concerning display security and operation security.

The setting security group information 153 and 163 is information set in advance by the user in the drawing apparatus 400 concerning each of the candidate screens B-1 to B-M and W-1 to W-N and the candidate display objects DO-1 to DO-7 as information for specifying a group (a security group) to which the candidate screen or the candidate display object belongs among a plurality of groups obtained by dividing security in a vertical division manner over a plurality of levels (see FIG. 4). For example, the setting security group information 153 and 163 includes information in which identifiers of candidate screens and security groups to which the candidate screens belong are associated with each other concerning the candidate screens B-1 to B-W and W-1 to W-N (see FIGS. 5(a) and 5(b)). Alternatively, for example, the setting security group information 153 and 163 includes information in which identifiers of candidate display objects and security levels to which the candidate display objects belong are associated with each other concerning the candidate display objects DO-1 to DO-7 (see FIGS. 5(c) and 5(d)). The setting security group information 153 and 163 concerning the candidate screens B-1 to B-W and W-1 to W-N includes security groups concerning display security. On the other hand, the setting security group information 153 and 163 concerning the candidate display objects DO-1 to DO-7 includes security groups concerning display security and operation security.

The security indicates control of authority for display and operation of screens of the programmable display 100 and display objects arranged on the screens. The security does not indicate security such as vaccines for data falsification prevention and virus attack.

The display screen 130 plays functions of both of a display unit 131 and an operation input unit 132. The display screen 130 displays graphics and characters, detects an operated part by the operator on the display unit 131, and inputs input information corresponding to the operated part to the programmable display 100. The display unit 131 is, for example, an LCD (a liquid crystal display device). The operation input unit 132 is, for example, a touch panel. The operation processing unit 140 determines the input information from the display screen 130 and supplies the input information to the control unit 110.

For example, upon detecting an instruction for an operation start via the operation input unit 132, the operation processing unit 140 supplies the detected instruction for the operation start to the control unit 110. The control unit 110 reads out, according to the instruction for the operation start, the drawing data 151 from the non-volatile memory 150 to the work memory 160 as the drawing data 161. The control unit 110 performs, based on definition content of the read-out drawing data 161, predetermined control, for example, control for screen display and operation or communication with an externally connected apparatus (e.g., the control apparatus 200 connected via the communication interface 180).

Note that, in this example, the drawing data 151 is once loaded into the work memory 160 as the drawing data 161 and the predetermined control is performed based on the loaded drawing data 161. However, the drawing data 151 may be directly read out from the non-volatile memory 150 and the predetermined control may be performed based on the read-out drawing data 151.

For example, the control unit 110 includes a security authenticating unit 111 and a security control unit 112 as components for performing the predetermined operation.

The security authenticating unit 111 performs authentication processing of security for the operator of the programmable display 100. Specifically, the security authenticating unit 111 controls the display processing unit 120 according to the instruction for the operation start such that a login screen including an operator ID input box and a password input box is displayed on the display unit 131. Upon receiving an input of an operator ID and a password via the operation input unit 132 and the operation processing unit 140, the security authenticating unit 111 accesses the non-volatile memory 150 and refers to the operator management information 154. The security authenticating unit 111 determines whether an operator ID and a password coinciding with the received operator ID and the received password are present in the operator management information 154. When an operator ID and a password coinciding with the received operator ID and the received password are present in the operator management information 154, the security authenticating unit 111 authenticates the operator (treats the authentication as a success). When an operator ID and a password coinciding with the received operator ID and the received password are absent in the operator management information 154, the security authenticating unit 111 does not authenticate the operator (treats the authentication as a failure).

The security authenticating unit 111 specifies, concerning the authenticated operator, operation security level information and operation security group information. Specifically, the operator management information 154 is, for example, information in which an operator ID, a password, a security level, and a security level group are associated with one another concerning a plurality of operator IDs (see FIG. 6). The security authenticating unit 111 specifies, by referring to the operator management information 154, a security level and a security group corresponding to the received operator ID and the received password respectively as an operation security level and an operation security group. The security authenticating unit 111 stores the operation security level and the operation security group in the work memory 160 respectively as operation security level information 164 and operation security group information 165.

The operation security level information 164 is information specified concerning the authenticated operator by the security authenticating unit 111 as information for specifying a level (a security level) to which the operator belongs among a plurality of levels obtained by ranking security in a horizontal division manner (see FIG. 4). That is, the operation security level information 164 is information indicating a security level to which the authenticated operator, who operates the programmable display 100, belongs.

The operation security group information 165 is information set in advance by the user concerning the authenticated operator in the drawing apparatus 400 as information for specifying a group (a security group) to which the operator belongs among a plurality of groups obtained by dividing security in a vertical division manner over a plurality of levels (see FIG. 4). That is, the operation security group information 165 is information indicating a security group to which the authenticated operator, who operates the programmable display 100, belongs.

The operation security level and the operation security group may be managed (controlled) by a method of allocating in advance a device 201, which stores the operation security level and the operation security group, to the externally connected control apparatus (e.g., PLC) 200 or the internal device 166 of the programmable display 100 and switching the devices according to conditions. The authentication by the security authenticating unit 111 is not limited to the authentication performed using an operator ID and a password and may be, for example, authentication performed using biometrics information such as a fingerprint or an iris or may be authentication by an IC card or a barcode.

The security control unit 112 performs control of security for screens and objects. Specifically, the security control unit 112 includes a first comparing unit 113, a second comparing unit 114, a first determining unit 115, a second determining unit 116, and a screen generating unit 117.

The first comparing unit 113 accesses the work memory 160, acquires the operation security level information 164 specified by the security authenticating unit 111, and acquires the setting security level information 162 included in the drawing data 161. The first comparing unit 113 accesses the work memory 160 and specifies, as a screen and display objects that should be displayed on the display unit 131, a screen corresponding to the instruction for the operation start among a plurality of candidate screens and a plurality of display objects associated with the screen included in the drawing data 161. The first comparing unit 113 compares the operation security level information and the setting security level information concerning each of the screen and the display objects that should be displayed on the display unit 131.

For example, the first comparing unit 113 determines whether a security level of the operator is high or low compared with a setting security level set for each of the screen and the display objects that should be displayed on the display unit 131. The first comparing unit 113 supplies, to the second determining unit 116, comparison results concerning the screen and the display objects that should be displayed on the display unit 131.

The second determining unit 116 receives, from the first comparing unit 113, the comparison results concerning the screen and the display objects that should be displayed on the display unit 131. The second determining unit 116 determines, according to the comparison results by the first comparing unit 113, whether the operator satisfies the setting security level of the candidate screen or the candidate display object that should be displayed on the display unit 131. For example, when the security level of the operator is high compared with the setting security level of the screen, the second determining unit 116 determines that the operator satisfies the setting security level of the screen. When the security level of the operator is low compared with the setting security level of the screen, the second determining unit 116 determines that the operator does not satisfy the setting security level of the screen. Alternatively, for example, when the security level of the operator is high compared with the setting security level of the display object, the second determining unit 116 determines that the operator satisfies the setting security level of the display object. When the security level of the operator is low compared with the setting security level of the display object, the second determining unit 116 determines that the operator does not satisfy the setting security level of the display object. The second determining unit 116 supplies, to the screen generating unit 117, determination results of the security levels concerning the screen and the display objects that should be displayed on the display unit 131.

The second comparing unit 114 accesses the work memory 160, acquires the operation security group information 165 specified by the security authenticating unit 111, and acquires the setting security group information 163 included in the drawing data 161. The second comparing unit 114 accesses the work memory 160 and specifies, as a screen and display objects that should be displayed on the display unit 131, a screen corresponding to the instruction for the operation start among the candidate screens and a plurality of display objects associated with the screen included in the drawing data 161. The second comparing unit 114 compares the operation security group information and the setting security group information concerning each of the screen and the display objects that should be displayed on the display unit 131.

Figure 9:
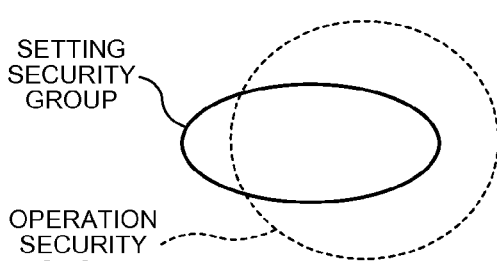
FIG. 9 is a diagram of details of check processing for a security group according to the embodiment.

For example, the second comparing unit 114 determines whether a security group of the operator coincides with a setting security group set for each of the screen and the display objects that should be displayed on the display unit 131 (see FIG. 9). The second comparing unit 114 supplies, to the first determining unit 115, comparison results concerning the screen and the display objects that should be displayed on the display unit 131.

The first determining unit 115 receives, from the second comparing unit 114, the comparison results concerning the screen and the display objects that should be displayed on the display unit 131. The first determining unit 115 determines, according to the comparison results by the second comparing unit 114, whether the operator matches the setting security group of the candidate screen or the candidate display object that should be displayed on the display unit 131. For example, when the security group of the operator coincides with the setting security group of the screen, the first determining unit 115 determines that the operator matches the setting security group of the screen. When the security group of the operator does not coincide with the setting security group of the screen, the first determining unit 115 determines that the operator does not match the setting security group of the screen. Alternatively, for example, when the security group of the operator coincides with the setting security group of the display object, the first determining unit 115 determines that the operator matches the setting security group of the display object. When the security group of the operator does not coincide with the setting security group of the display object, the first determining unit 115 determines that the operator does not match the setting security group of the display object. The first determining unit 115 supplies, to the screen generating unit 117, determination results of the security groups concerning the screen and the display objects that should be displayed on the display unit 131.

The screen generating unit 117 receives, from the second determining unit 116, determination results of the security levels concerning the screen and the display objects that should be displayed on the display unit 131 and receives, from the first determining unit 115, determination results of the security groups concerning the screen and the display objects that should be displayed on the display unit 131. The screen generating unit 117 determines, according to the determination results of the security levels and the determination results of the security groups, for example, display/non-display concerning each of the screen and the display objects that should be displayed on the display unit 131 and determines permission/non-permission of operation concerning each of the display objects (see FIGS. 10 to 13). The screen generating unit 117 generates, according to the determination results, screen generation information 167 including the screen and the display objects that should be displayed and stores the screen generation information 167 in the work memory 160. When it is determined that the screen is not displayed, the screen generating unit 117 does not generate the screen generation information 167.

The display processing unit 120 refers to the work memory 160 through the control unit 110, acquires the screen generation information 167, and generates, according to the screen generation information 167, screen data 168 including a screen and a plurality of display objects arranged in the screen. The display processing unit 120 displays, according to the screen data 168, the screen and the display objects arranged in the screen on the display unit 131 (see FIGS. 10 to 13).

Next, the setting security level, the setting security group, the operation security level, and the operation security group will be explained with reference to FIGS. 3 to 5.

When drawing data is created by the drawing apparatus 400, first, screens are created and display objects are arranged on the screens. As the screens, the base screens B-1 to B-M shown in FIG. 3(a) and the window screens W-1 to W-N shown in FIG. 3(b) are prepared. The base screens B-1 to B-M are, for example, screens displayed as the background on the display unit 131. The window screens W-1 to W-N are, for example, screens displayed in the base screens B-1 to B-M on the display unit 131.

In each of the screens B-1 to B-M and W-1 to W-N, for example, as shown in FIG. 3(c), various display objects DO-1 to DO-7 are arranged. As illustratively shown in FIG. 3(c), a plurality of display objects DO-1 to DO-7 are arranged in the base screen B-1. The display object DO-1 is, for example, graph display. The display object DO-2 is, for example, character display. The display object DO-3 is, for example, numerical value display. The display objects DO-4 to DO-7 are, for example, touch switches.

A security level and a security group are set concerning each of the candidate screens B-1 to B-M and W-1 to W-N and the candidate display objects DO-1 to DO-7. As shown in FIG. 4, the security level is an index for ranking security of a candidate screen or a candidate display object in a horizontal division manner over a plurality of candidate screens and a plurality of candidate display objects and managing the security. The security level includes a hierarchical plurality of levels (the security level=1 to 15). On the other hand, the security group is an index for grouping the security of the candidate screen or the candidate display object in a vertical division manner over the levels (e.g., the security level=1 to 15) and managing the security. The security group includes a plurality of groups (e.g., the security group=1 to 31) obtained by dividing security in a vertical division manner over the levels.

For example, for each of the base screens B-1 to B-M, as shown in FIG. 5(a), to control authority of permission/non-permission of display of the screens, a setting security level and a setting security group concerning display security are set.

For example, for each of the window screens W-1 to W-N, as shown in FIG. 5(b), to control authority of permission/non-permission of display of the screens, a setting security level and a setting security group concerning display security are set.

For each of the display objects DO-1 to DO-7, to control authority of permission/non-permission of display of the objects, a setting security level and a setting security group concerning display security are set (see FIG. 5(c)). At the same time, when a target object is an object for performing input and operation (e.g., a touch switch), a setting security level and a setting security group concerning operation security are set (see FIG. 5(d)).

The setting security level is designated by, for example, numerical values 0 to 15. The setting security level indicates that, for example, as a numerical value is larger, a level to which a candidate screen or a candidate display object belongs is high. The setting security level=0 indicates that, for example, a level to which a candidate screen or a candidate display object belongs is absent.

The setting security group is designated by, for example, numerical values 0 to 31. The setting security group=0 indicates that, for example, a group to which a candidate screen or a candidate display object belongs is absent.

The sizes of the ranges of the security level and the security group may be different from each other. In this embodiment, a setting security group per unit for setting security (display and operation of a screen or an object) may belong to one group or may belong to a plurality of groups.

On the other hand, the operation security level information includes one value representing authority of the present operator. The operation security group information includes information concerning one or a plurality of groups to which the present operator belongs. Specifically, the operation security level information is represented by an integer value (e.g., integer values 0 to 15). For example, when 31 groups are present as security groups, information equivalent to 31 bits is allocated to the operation security group information. The operation security group information represents that the present operator belongs to a group corresponding to an ON bit. This is an example of a representation method. Other methods can be used as long as the same representation can be realized.

As a method of control of the operation security level and the operation security group, operator IDs and passwords for the programmable display 100 are provided for respective operators. In each of the operator IDs, a security level and a security group to which the operator having the operator ID belongs are defined as the operator management information 154 shown in FIG. 6.

For example, the operator management information 154 includes information in which an operator ID, a password, a security level, and a security group are associated with one another concerning a plurality of operator IDs. That is, the operator management information 154 includes an operator ID column 1541, a password column 1542, a security level column 1543, and a security group column 1544. In the operator ID column 1541, a plurality of operator IDs concerning a plurality of operators who are candidates for using the programmable display 100 are recorded. In the password column 1542, a plurality of passwords concerning the operators are recorded. In the security level column 1543, security levels to which the operators belong are recorded. In the security group column 1544, security groups to which the operators belong are recorded.

As explained above, the operator management information 154 is referred to, for example, in the authentication processing for the operator by login operation. Further, the operator management information 154 is referred to when an operation security level and an operation security group are specified thereafter.

Figures 6, 7:
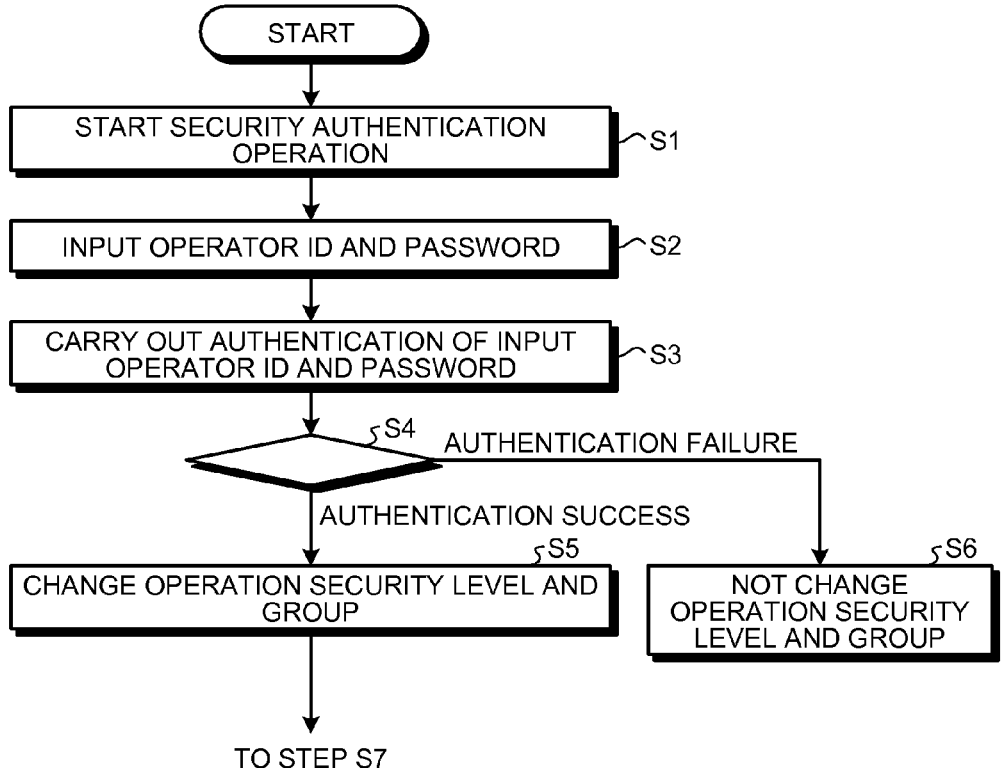
FIG. 6 is a diagram showing the configuration of operator management information in the embodiment.
FIG. 7 is a flowchart illustrating the operation of the programmable display according to the embodiment.
Figure 8:
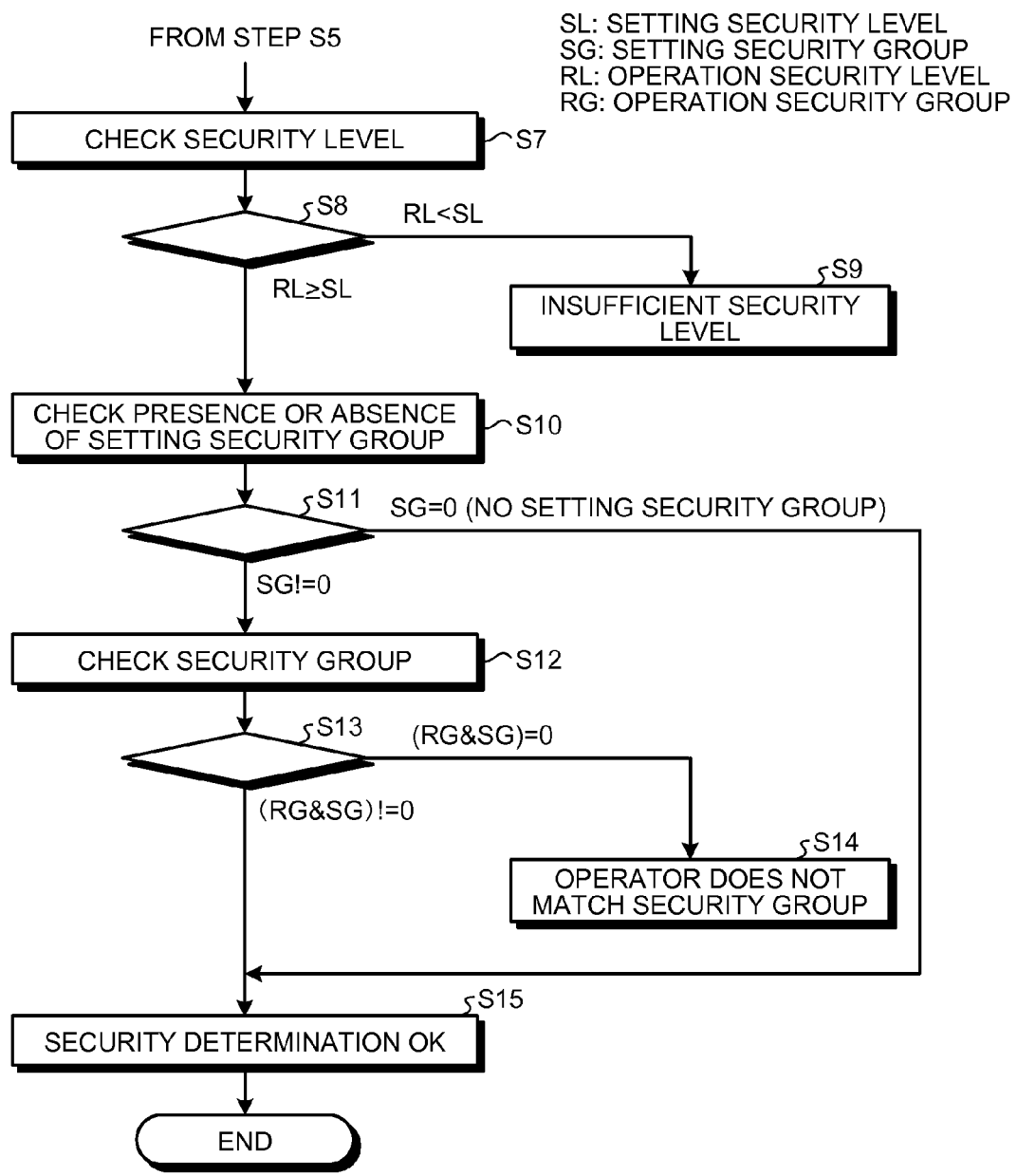
FIG. 8 is a flowchart illustrating the operation of the programmable display according to the embodiment.

Next, the operation of the programmable display 100 will be explained with reference to a flowchart of FIGS. 7 and 8.

At Step S1, the security authenticating unit 111 controls, according to an instruction for an operation start, the display processing unit 120 such that a login screen including an operator ID input box and a password input box is displayed on the display unit 131.

At Step S2, the security authenticating unit 111 receives an input of an operator ID and a password via the operation input unit 132 and the operation processing unit 140.

At Step S3, the security authenticating unit 111 accesses the non-volatile memory 150, refers to the operator management information 154, and determines whether an operator ID and a password coinciding with the received operator ID and the received password are present in the operator management information 154.

At Step S4, when an operator ID and a password coinciding with the received operator ID and the received password are present in the operator management information 154 ("authentication success" at Step S4), the security authenticating unit 111 authenticates the operator (treats the authentication as a success), and advances the processing to Step S5. When an operator ID and a password coinciding with the received operator ID and the received password are absent in the operator management information 154, the security authenticating unit 111 does not authenticate the operator (treats the authentication as a failure) and advances the processing to Step S6.

At Step S5, the security authenticating unit 111 specifies operation security level information and operation security group information concerning the authenticated operator. Specifically, the operator management information 154 is, for example, information in which an operator ID, a password, a security level, and a security group are associated with one another concerning a plurality of operator IDs (see FIG. 6). The security authenticating unit 111 specifies a security level and a security group corresponding to the received operator ID and the received password respectively as an operation security level and an operation security group by referring to the operator management information 154. The security authenticating unit 111 stores the operation security level and the operation security group in the work memory 160 respectively as the operation security level information 164 and the operation security group information 165, for example, by overwriting. Consequently, the operation security level information 164 and the operation security group information 165 stored in the work memory 160 are changed.

At Step S6, the operation security level information 164 and the operation security group information 165 stored in the work memory 160 are not changed. At this point, the security authenticating unit 111 may perform, for example, error display indicating "authentication failure" on the display unit 131.

At Step S7, the first comparing unit 113 accesses the work memory 160, acquires the operation security level information 164 specified by the security authenticating unit 111, and acquires the setting security level information 162 included in the drawing data 161. The first comparing unit 113 accesses the work memory 160 and specifies, as a screen and display objects that should be displayed on the display unit 131, a screen corresponding to the instruction for the operation start among a plurality of candidate screens and a plurality of display objects associated with the screen included in the drawing data 161. The first comparing unit 113 compares the operation security level information and the setting security level information concerning each of the screen and the display objects that should be displayed on the display unit 131.

For example, the first comparing unit 113 determines whether a security level of the operator is high or low compared with a setting security level set for each of the screen and the display objects that should be displayed on the display unit 131. The first comparing unit 113 supplies, to the second determining unit 116, comparison results concerning the screen and the display objects that should be displayed on the display unit 131.

The second determining unit 116 receives, from the first comparing unit 113, the comparison results concerning the screen and the display objects that should be displayed on the display unit 131. The second determining unit 116 determines (checks), according to the comparison results by the first comparing unit 113, whether the operator satisfies the setting security level of the candidate screen or the candidate display object that should be displayed on the display unit 131.

At Step S8, when the security level of the operator is the same as the setting security level of the screen or the display object or high compared with the setting security level of the screen or the display object ("RL≥SL" at Step S8), the second determining unit 116 determines that the operator satisfies the setting security level of the screen or the display object and advances the processing to Step S10. When the security level of the operator is low compared with the setting security level of the screen or the display object ("RL<SL" at Step S8), the second determining unit 116 determines that the operator does not satisfy the setting security level of the screen or the display object and advances the processing to Step S9.

The setting security level=0 indicates that, for example, a level to which the candidate screen or the candidate display object belongs is absent, and if the security level of the operator is equal to or larger than 1, it is determined that the operator satisfies the setting security level of the screen or the display object. That is, when it is specified by setting security level information corresponding to the candidate screen or the candidate display object, which should be displayed on the display unit 131, that a level to which the candidate screen or the candidate display object belongs is absent, irrespective of the comparison results by the first comparing unit 113, the second determining unit 116 determines that the operator satisfies the setting security level of the candidate screen or the candidate display object that should be displayed on the display unit 131.

At Step S9, the second determining unit 116 supplies, to the screen generating unit 117, a determination result that the operator does not satisfy the setting security level of the screen or the display object, i.e., the operator has an insufficient security level.

At Step S10, the second determining unit 116 supplies, to the screen generating unit 117, a determination result that the operator satisfies the setting security level of the screen or the display object.

The second comparing unit 114 accesses the work memory 160, acquires the operation security group information 165 specified by the security authenticating unit 111, and acquires the setting security group information 163 included in the drawing data 161. The second comparing unit 114 accesses the work memory 160 and specifies, as a screen and display objects that should be displayed on the display unit 131, a screen corresponding to the instruction for the operation start among the candidate screens and a plurality of display object associated with the screen included in the drawing data 161. The second comparing unit 114 supplies the specification results of to the first determining unit 115.

The first determining unit 115 receives, from the second comparing unit 114, the specification results of the screen and the display object that should be displayed on the display unit 131. The first determining unit 115 accesses the work memory 160 and acquires the setting security group information 163 included in the drawing data 161. The first determining unit 115 determines whether it is specified by the setting security group information 163 corresponding to the candidate screen or the candidate display object, which should be displayed on the display unit 131, that a level to which the candidate screen or the candidate display object belongs is absent. That is, the first determining unit 115 determines (checks), based on the specification content of the setting security group information 163, presence or absence of a setting security group concerning each of the screen and the display objects that should be displayed on the display unit 131.

At Step S11, when a setting security group of the screen or the display object is present ("SG!=0" at Step S11) ("!=0" means a number other than zero), the first determining unit 115 advances the processing to Step S12. When a setting security group of the screen or the display object is absent ("SG=0" at Step S11), the first determining unit 115 advances the processing to Step S15.

At Step S12, the second comparing unit 114 compares the operation security group information and the setting security group information concerning each of the screen and the display objects that should be displayed on the display unit 131.

For example, the second comparing unit 114 determines whether a security group of the operator coincides with a setting security group set for each of the screen and the display objects that should be displayed on the display unit 131 (see FIG. 9). The second comparing unit 114 supplies, to the first determining unit 115, comparison results concerning the screen and the display objects that should be displayed on the display unit 131.

The first determining unit 115 receives, from the second comparing unit 114, the comparison results concerning the screen and the display objects that should be displayed on the display unit 131. The first determining unit 115 determines (checks), according to the comparison results by the second comparing unit 114, whether the operator matches the setting security group of the candidate screen or the candidate display object that should be displayed on the display unit 131.

At Step S13, for example, when the security group of the operator coincides with the setting security group of the candidate screen or the candidate display object ("(RG&SG)!=0" at Step S13), the first determining unit 115 advances the processing to Step S15. When the security group of the operator does not coincide with the setting security group of the candidate screen or the candidate display object ("(RG&SG)=0" at Step S13), the first determining unit 115 advances the processing to Step S14 ("&" represents AND).

At Step S14, the first determining unit 115 determines that the operator does not match the setting security group of the candidate screen or the candidate display object and supplies a determination result to the screen generating unit 117.

At Step S15, the first determining unit 115 determines that the operator matches the setting security group of the candidate screen or the candidate display object and supplies a determination result to the screen generating unit 117.

The setting security group=0 indicates that, for example, a group to which the candidate screen or the candidate display object belongs is absent, and if the setting security group is =0, the first determining unit 115 advances from Step S11 to Step S15. That is, when it is specified by the setting security group information 163 corresponding to the candidate screen or the candidate display object, which should be displayed on the display unit 131, that a group to which the candidate screen or the candidate display object belongs is absent, irrespective of the comparison results by the second comparing unit 114, the first determining unit 115 determines that the operator matches the setting security group of the candidate screen or the candidate display object that should be displayed on the display unit 131.

Next, details of the determination of a security group (Step S12) will be explained with reference to FIG. 9.

In the example explained above, it is determined whether the operator matches the setting security group of the candidate screen or the candidate display object according to whether the setting security group and the operation security group coincide with each other. When each of the setting security group and the operation security group includes only one group, the determination only simply has to be made according to whether the setting security group and the operation security group coincide with each other. However, when at least one of the setting security group and the operation security group includes a plurality of groups, as ways the setting security group and the operation security group coincide with each other, for example, three cases shown in FIG. 9 are present.

In a case 1161, the determination is regarded as successful if a part of one or more setting security groups and a part of one or more operation security groups coincide with each other. Besides, as in a case 1162, it is also possible to regard that the determination is successful for an operator having a plurality of operation security groups belonging to all groups designated by a plurality of setting security groups. This is referred to as a security group determination system. A system for regarding that the determination is successful if a part of setting security groups and a part of operation security groups coincide with each other (the case 1161) is referred to as "partial match". A system for regarding that the determination is successful when operation security groups include all setting security groups (the case 1162) is referred to as "perfect inclusion".

For example, when the method of allocating security groups to bits is adopted as explained above, a determination formula is described below wherein a bit pattern of a setting security group (a pattern in which a bit corresponding to a group to which the operator belongs is ON and the other bits are OFF) is represented as SG, a bit pattern of an operation security group (a pattern in which a bit corresponding to a group to which the operator belongs is ON and the other bits are OFF) is represented as RG, AND is represented as &, and logical NOT is represented as !.

In the "partial match" system of the case 1161, it is regarded that the determination is successful when a determination formula of the following numerical formula 1 holds.

(RG&SG)!=0    Numerical formula 1

In the "perfect inclusion" system of the case 1162, it is regarded that the determination is successful when a determination formula of the following numerical formula 2 holds.

(RG&SG)=SG    Numerical formula 2

In the "partial match" system, it is regarded that the determination is successful if the operation security group matches at least any one of security groups set for a screen or a display object. Therefore, the "partial match" system is suitable for, for example, a use in which a plurality of groups that can operate the screen or the display object are present.

In the "perfect inclusion" system, the operation security group needs to match all the security groups set for the screen or the display object. Therefore, the "perfect inclusion" system is suitable for, for example, a case where it is desired to provide composite authority to perform viewing and operation of the screen or the display object. For example, in an example of a factory, the "perfect inclusion" system is suitable when used in such a way that a group representing applied targets such as lines A and B and a group representing managerial classes such as a group leader and a worker are provided and a certain object is set operable in the line A and by only an operator corresponding to the group leader.

As in a case 1163, a system is also possible in which it is regarded that the determination is successful when all of a plurality of operation security groups of an operator belong to all groups designated by a plurality of setting security groups. This system is referred to as "inverse perfect inclusion".

In the "inverse perfect inclusion" system of the case 1163, it is regarded that the determination is successful when a determination formula of the following numerical formula 3 holds.

(RG&SG)=RG    Numerical formula 3

Alternatively, although not shown in the figure, a system is also possible in which it is regarded that the determination is successful when a plurality of setting security groups set for a screen or a display object and a plurality of operation security groups of an operator perfectly coincide with each other. This system is referred to as "perfect match".

In the "perfect match" system, it is regarded that the determination is successful when a determination formula of the following numerical formula 4 holds.

(RG&SG)=SG=RG    Numerical formula 4

Next, the operations of a security level and a security group for a screen (a candidate screen) will be explained.

For the security level of the screen, display or operation is enabled when an operation security level≥a setting security level.

For the security group of the screen, display or operation is enabled when the numerical formulas 1 to 4 hold. For example, in the case of the "partial match" system of the case 1161, display or operation is enabled if a part of one or more setting security groups and a part of one or more operation security groups coincide with each other, i.e., if the numerical formula 1 holds. For example, in the case of the "perfect inclusion" system of the case 1162, display or operation is enabled when one or more setting security groups are included in a plurality of operation security groups, i.e., if the numerical formula 2 holds.

However, exceptionally, when a value of a setting security group is 0, although a group to which the candidate screen or the candidate display object belongs is absent, the setting security group is treated as belonging to all groups and viewing and operation by an operator are enabled. That is, when the setting security group is 0, all users can perform viewing and operation.

A case is considered where, as shown in FIGS. 5(*a*) and 5(*b*), the setting security level and the setting security group are provided for each screen.

For the base screen B-1, both of the setting security level and the setting security group are set to 0. This means that security is not provided for both of the setting security level and the setting security group. That is, all operators can view the base screen B-1.

For the base screen B-2, the setting security level is set to 10 and the setting security group is set to 1. In this case, when the operation security level is equal to or higher than 10 and the operator belongs to a group 1 in the operation security group, the operator can view the base screen B-2.

The same rule is applied to the other screens.

Next, the operations of a security level and a security group for a display object (a candidate display object) will be explained.

A case is considered where, as shown in FIGS. 5(*c*) and 5(*d*), the setting security level and the setting security group concerning each of display security and operation security are allocated to the display objects arranged in the screen.

For example, the display object DO-1 is an object for performing only display and not involving operation (see FIG. 3(*c*)). Security for operation is absent. The setting security level and the setting security group are provided only for display.

However, in this example, both of the setting security level and the setting security group of the display object DO-1 are set to 0; therefore, all operators can view the display object DO-1.

For example, the display object DO-2 is an object involving operation in addition to display (e.g., character display). For the display, the setting security level=0 and the setting security group=1. For the operation, the setting security level=3 and the setting security group=1. For the display object DO-2, irrespective of an operation security level, display (viewing) is possible when the operator belongs to a security group=1. On the other hand, concerning the operation, the operation security level needs to be equal to or higher than 3.

For example, the display object DO-5 is an object involving operation in addition to display (e.g., a touch switch). For the display, the setting security level=3 and the setting security group=1. For the operation, the setting security level=5 and the setting security group=2. In the display object DO-5, security groups are different in display security and operation security. The operation security is based on the premise that a display object is displayed. Therefore, when the operation security is satisfied, display (viewing) of an object is simultaneously enabled. When this rule is applied, an operator having an operation security level equal to or higher than 3 and belonging to an operation security group=1 or 2 can display (view) the display object DO-5. An operator having an operation security level equal to or higher than 5 and belonging to the operation security group=2 can operate the display object DO-5.

Next, the operation of the display unit 131 according to a security level and a security group will be explained with reference to FIGS. 10 to 13.

As shown in FIG. 10, when a setting security level=0, a display form of a display object by the display unit 131 changes according to a setting security group and an operation security group.

For example, a display object in which a setting security group of display security=5 and a setting security group of operation security=10 are set is not displayed when the operation security group is 0 (a group to which the operator belongs is absent). When the operation security group is 5, the display object is displayed in a form indicating that display is possible but operation is impossible. When the operation security group is 10, the display object is displayed in a form indicating that both of display and operation are possible.

For example, a display object in which a setting security group of display security=0 (all) and a setting security group of operation security=5 are set is displayed in a form indicating that display is possible but operation is impossible when the operation security group is 0 (a group to which the operator belongs is absent). When the operation security group is 5, the display object is displayed in a form indicating that both of display and operation are possible. When the operation security group is 10, the display object is displayed in a form indicating that display is possible but operation is impossible.

As shown in FIG. 11, when the setting security level=0 and the operator belongs to a plurality of security groups, a display form of a display object by the display unit 131 changes according to the setting security group and the operation security group. In an example shown in FIG. 11, a determination system of a security group is the "perfect inclusion" system (the case 1162 shown in FIG. 9).

For example, a display object in which a setting security group of display security=5 and a setting security group of operation security=5 are set is not displayed when the operation security group is 0 (a group to which the operator belongs is absent). When the operation security group is 5, the display object is displayed in a form indicating that both of display and operation are possible. When the operation security group is 5 and 10 (the operator belongs to a plurality of groups), the display object is displayed in a form indicating that both of display and operation are possible.

For example, a display object in which a setting security group of display security=0 (all) and a setting security group of operation security=10 are set is displayed in a form indicating that display is possible but operation is impossible when the operation security group is 0 (a group to which the operator belongs is absent). When the operation security group is 5, the display object is displayed in a form indicating that display is possible but operation is impossible. When the operation security group is 5 and 10 (the operator belongs to a plurality of groups), the display object is displayed in a form indicating that both of display and operation are possible.

Figure 12:
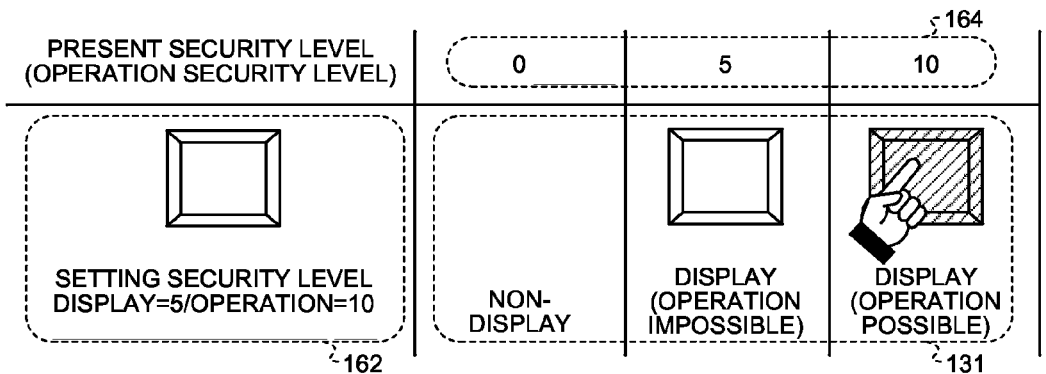
FIG. 12 is a diagram of the operation of the display unit according to the embodiment.

As shown in FIG. 12, when the setting security group=0, a display form of a display object by the display unit 131 changes according to the setting security level and the operation security level.

For example, a display object in which a setting security level of display security=5 and a setting security level of operation security=10 are set is not displayed when the operation security level is 0 (a group to which the operator belongs is absent). When the operation security level is 5, the display object is displayed in a form indicating that display is possible but operation is impossible. When the operation security level is 10, the display object is displayed in a form indicating that both of display and operation are possible.

Figure 13:
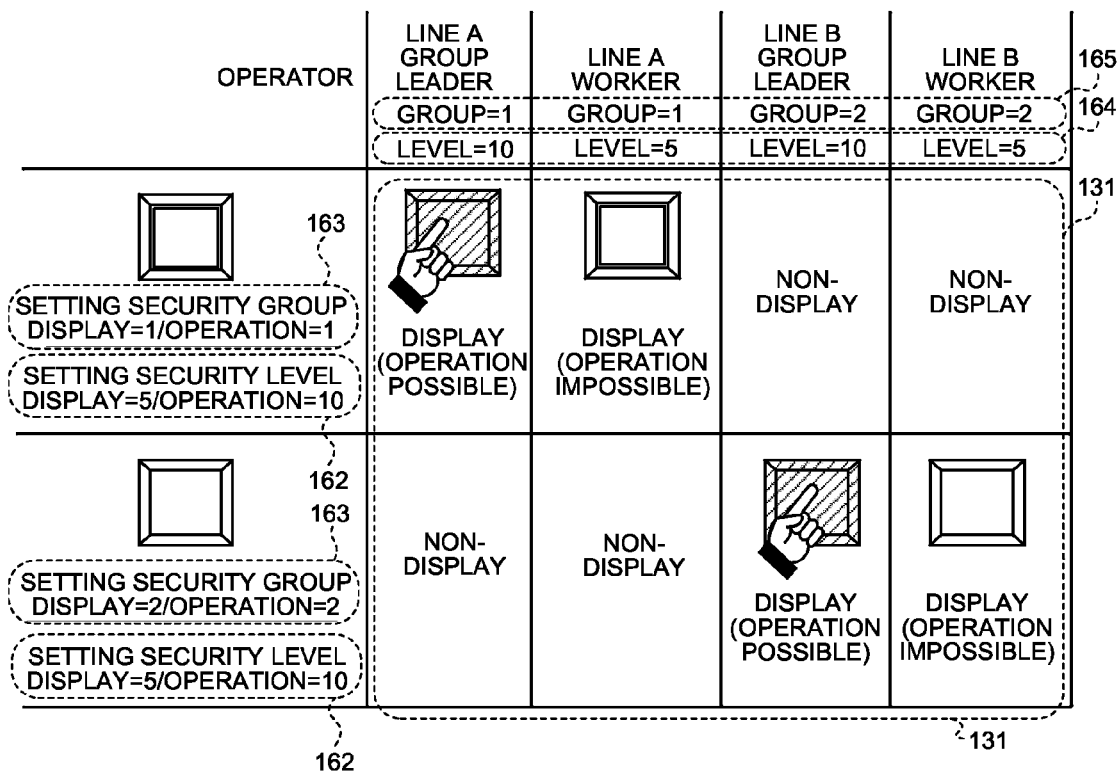
FIG. 13 is a diagram of the operation of the display unit according to the embodiment.

As shown in FIG. 13, when a setting security level≠0 and a setting security group≠0, a display form of a display object by the display unit 131 changes according to a setting security level, an operation security level, a setting security group, and an operation security group.

For example, a display object in which a setting security group of display security=1, a setting security group of operation security=1, a setting security level of display security=5, and a setting security level of operation security=10 are set is displayed in display forms explained below. When the operation security group is 1 and the operation security level is 10 (in the case of a line A group leader), the display object is displayed in a form indicating that both of display and operation are possible. When the operation security group is 1 and the operation security level is 5 (in the case of a line A worker), the display object is displayed in a form indicating that display is possible but operation is impossible. When the operation security group is 2 and the operation security level is 10 (in the case of a line B group leader), the display object is not displayed. When the operation security group is 2 and the operation security level is 5 (in the case of a line B worker), the display object is not displayed.

For example, a display object in which a setting security group of display security=2, a setting security group of operation security=2, a setting security level of display security=5, and a setting security level of operation security=10 are set is displayed in display forms explained below. When the operation security group is 1 and the operation security level is 10 (in the case of the line A group leader), the display object is not displayed. When the operation security group is 1 and the operation security level is 5 (in the case of the line A worker), the display object is not displayed. When the operation security group is 2 and the operation security level is 10 (in the case of the line B group leader), the display object is displayed in a form indicating that both of display and operation are possible. When the operation security group is 2 and the operation security level is 5 (in the case of the line B worker), the display object is displayed in a form indicating that display is possible but operation is impossible.

As explained above, in the embodiment, in the programmable display 100, the user who designs a screen of a programmable display is enabled to set a security level (a setting security level) and a security group for controlling authority of display and operation for objects arranged on a screen of the programmable display 100 (components arranged on the screen to present functions such as a lamp and a switch) and the screen itself. On the other hand, states of a security level and a security group at the point of the operation of the programmable display 100 are respectively set as an operation security level and an operation security group. In this case, when the operation security level has a value equal to or larger than the setting security level and the operation security group coincides with the setting security group, the user is enabled to display and operate the objects or the screen. Consequently, it is possible to perform hierarchical management of operation authority for the objects and the screen according to a level. For example, only an operator having high authority is enabled to view and operate a certain object. On the other hand, it is also possible to perform vertically divided management of operation authority for an apparatus. For example, the operation authority is limited according to targets managed by departments of operators (jobs that the operators are in charge of) even if the operators are equal in terms of authority.

For example, a programmable display that monitors lines of a factory is assumed. It is assumed that the programmable display has a role of monitoring and operating two lines such as a line A and a line B. In this case, a use is assumed in which group leaders and workers are independently present respectively for the line A and the line B, the group leaders and the workers can perform viewing and operation only concerning the lines that the group leaders and the workers are in charge of, and the group leaders are permitted to perform setting operation that the workers cannot perform. In this case, the above use can be satisfied by applying the concept of a group to distinction of the line A and the line B and applying the concept of a level to distinction of the group leaders and the workers.

Therefore, according to the embodiment, it is possible to not only rank security in a horizontal division manner for each of a screen and display objects that should be displayed on the display unit 131 and manage the security but also group the security in a vertical division manner and manage the security.

In the embodiment, in the programmable display 100, the display processing unit 120 displays a screen and a plurality of display objects arranged in the screen on the display unit 131. The non-volatile memory 150 stores, concerning each of a candidate screen and candidate display objects that should be displayed on the display unit 131, the setting security level information 152 for specifying a level to which the candidate screen or the candidate display object belongs among a plurality of levels obtained by ranking security in a horizontal division manner and the setting security group information 153 for specifying a group to which the candidate screen or the candidate display object belongs among a plurality of groups obtained by dividing security in a vertical division manner over a plurality of levels. The work memory 160 also stores the setting security level information 162 and the setting security group information 163. Consequently, information that should be compared with the operation security level and the operation security group is stored in the programmable display 100. Therefore, it is possible to provide the programmable display 100 suitable for not only ranking security in a horizontal division manner for each of a screen and display objects that should be displayed on the display unit 131 and managing the security but also grouping the security in a vertical division manner and managing the security.

Further, in the embodiment, in the programmable display 100, the security authenticating unit 111 performs authentication processing for an operator who operates the programmable display 100 and, concerning the authenticated operator, specifies the operation security level information 164 for specifying a level to which the operator belongs among a plurality of levels obtained by ranking security in a horizontal division manner and the operation security group information 165 for specifying a group to which the operator belongs among a plurality of groups obtained by dividing security in a vertical division manner over a plurality of levels. The first comparing unit 113 compares the operation security level information 164 specified by the security authenticating unit 111 and the setting security level information 152 and 162 corresponding to the candidate screen or the candidate display object that should be displayed on the display unit. The second comparing unit 114 compares the operation security group information 165 specified by the security authenticating unit 111 and the setting security group information 163 corresponding to the candidate screen or the candidate display object that should be displayed on the display unit 131. Consequently, in the programmable display 100, the setting security level and the operation security level are compared and the setting security group and the operation security group are compared. Therefore, it is possible to provide the programmable display 100 suitable for not only ranking security in a horizontal division manner for each of a screen and display objects that should be displayed on the display unit 131 and managing the security but also grouping the security in a vertical division manner and managing the security.

In the embodiment, when at least one of the operation security group information 165 and the setting security group information 153 and 163 includes a plurality of groups, the first determining unit 115 performs, for example, the determination of the "partial match" system. That is, when there is a group partially coinciding with groups included in the operation security group information 165 and groups included in the setting security group information 153 and 163, the first determining unit 115 determines that the operator matches the setting security group of the candidate screen or the candidate display object that should be displayed on the display unit 131. When there is no group partially coinciding with the groups included in the operation security group information 165 and the groups included in the setting security group information 153 and 163, the first determining unit 115 determines that the operator does not match the setting security group of the candidate screen or the candidate display object that should be displayed on the display unit 131. In this way, by performing the determination of the "partial match" system, the first determining unit 115 determines that the determination is successful according to partial coincidence of the operation security group and the setting security group while allowing partial inconsistency between the operation security group and the setting security group. Therefore, it is possible to perform the determination processing under relaxed conditions and realize system operation with importance attached to flexibility.

Alternatively, in the embodiment, when at least one of the operation security group information 165 and the setting security group information 153 and 163 includes a plurality of groups, the first determining unit 115 performs, for example, the determination of the "perfect inclusion" system, the "inverse perfect inclusion" system, or the "perfect match" system. That is, when one of a group included in the operation security group information 165 and a group included in the setting security group information 153 and 163 is included in the other or perfectly coincides with the other, the first determining unit 115 determines that the operator matches the setting security group of the candidate screen or the candidate display object that should be displayed on the display unit 131. When one of the group included in the operation security group information 165 and the group included in the setting security group information 153 and 163 is not included in the other and does not perfectly coincide with the other, the first determining unit 115 determines that the operator does not match the setting security group of the candidate screen or the candidate display object that should be displayed on the display unit 131. In this way, by performing the determination of the "perfect inclusion" system, the "inverse perfect inclusion" system, or the "perfect match" system, the first determining unit 115 determines that the determination is successful according to sufficient coincidence of at least one of the operation security group and the setting security group with the other while excluding partial inconsistency between the operation security group and the setting security group. Therefore, it is possible to perform the determination processing under stricter conditions and realize system operation with importance attached to high security.

In this embodiment, when it is specified by the setting security group information 153 and 163 corresponding to the candidate screen or the candidate display object, which should be displayed on the display unit 131, that a group to which the candidate screen or the candidate display object belongs is absent, irrespective of the comparison results by the second comparing unit 114, the first determining unit 115 determines that the operator matches the setting security group of the candidate screen or the candidate display object that should be displayed on the display unit 131. Consequently, it is possible to improve flexibility of management by the programmable display 100 in grouping security in a vertical division manner according to a security group and managing the security.

In the embodiment, when it is specified by the setting security level information 152 and 162 corresponding to the candidate screen or the candidate display object, which should be displayed on the display unit 131, that a level to which the candidate screen or the candidate display object belongs is absent, irrespective of the comparison results by the first comparing unit 113, the second determining unit 116 determines that the operator satisfies the setting security level of the candidate screen or the candidate display object that should be displayed on the display unit 131. Consequently, it is possible to improve flexibility of management by the programmable display 100 in ranking security in a horizontal division manner according to a security level and managing the security.

INDUSTRIAL APPLICABILITY

As explained above, the programmable display according to the present invention is useful as a user interface for a control apparatus that manages a plurality of apparatuses.

REFERENCE SIGNS LIST

10 control system
100 programmable display
110 control unit
111 security authenticating unit
112 security control unit
113 first comparing unit
114 second comparing unit
115 first determining unit
116 second determining unit
117 screen generating unit
120 display processing unit
130 display screen
131 display unit
132 operation input unit
140 operation processing unit
150 non-volatile memory
151 drawing data
152 setting security level information
153 setting security group information
154 operator management information
160 work memory
161 drawing data
162 setting security level information
163 setting security group information
164 operation security level information
165 operation security group information
166 internal device
167 screen generation information
168 screen data
170 external-apparatus-communication processing unit
180 communication interface
190 communication interface
200 control apparatus
201 device
301 to 303 apparatus
400 drawing apparatus

The invention claimed is:

1. A programmable display comprising:
a communication interface configured to connect to a control apparatus which controls a plurality of apparatuses;
a display configured to display at least one screen and a plurality of objects arranged in the screen based on setting security level information and setting security group information and operation security level information and operation security group information of an operator requesting displaying of the at least one screen, which are determined by a processor; and
a memory configured to store setting security level information indicating a level to which a candidate belongs among a plurality of levels obtained by ranking security in a horizontal division manner and setting security group information indicating a group to which the candidate belongs among a plurality of groups obtained by ranking the security in a vertical division manner among the plurality of levels,
wherein the candidate comprises one of a screen from the at least one screen and one of the plurality of objects,
wherein the memory stores the security level information and the security setting group for each of the at least one screen and for each of the plurality of objects displayed on the screen,
wherein the horizontal division manner hierarchically divides the security into levels based on various levels of operation authority of operators, and
wherein the vertical division manner divides the security into groups based on various targets corresponding to apparatuses from the plurality of apparatuses that the operators manage.

2. The programmable display according to claim 1, wherein the processor is further configured to:
authenticate the operator who operates the programmable display,
specify, for the operator, the operation security level information indicating a level to which the operator belongs among a plurality of operator levels obtained by ranking the security in the horizontal division manner and the operation security group information indicating a group to which the operator belongs among a plurality of groups obtained by dividing the security in the vertical division manner among the plurality of operator levels;
compare the operation security level information and the setting security level information corresponding to the candidate requested for the displaying by the operator; and
compare the operation security group information and the setting security group information corresponding to the candidate requested for the displaying by the operator.

3. The programmable display according to claim 2, wherein the processor is further configured to determine whether the operator matches the setting security group of the candidate based on the comparison, and
wherein, in response to at least one of the operation security group information and the setting security group information comprising a plurality of groups, the processor determines that the operator matches the setting security group information of the candidate based on an operation group included in the operation security group information matching a security group included in the setting security group information, and wherein in response to none of the operation groups included in the operation security group information matching with a security group included in the setting security group information, the processor determines that the operator does not match the setting security group of the candidate.

4. The programmable display according to claim 2, wherein the processor further determines whether the operator matches a setting security group of the candidate based on the comparison between the operation security group information and the setting security group information, wherein, in response to at least one of the operation security group information and the setting security group information comprising a plurality of groups, the processor determines, that the operator matches the setting security group of the candidate based on one of the plurality of groups included in the operation security group information and matching a security group included in the setting security group information, wherein, in response to one of the plurality of groups included in the operation security group information not matching the security group included in the setting security group information, the processor determines that the operator does not match the setting security group of the candidate.

5. The programmable display according to claim 2, wherein, in response to the setting security group information corresponding to the candidate indicating that a group to which the candidate belongs is unspecified, the processor determines that the operator matches the setting security group information of the candidate.

6. The programmable display according to claim 2, wherein, in response to the comparing the operation security level information and the setting security level information, the processor determines whether the operator satisfies a setting security level of the candidate, wherein, in response to the setting security level information corresponding to the candidate indicating that a level to which the candidate belongs is unspecified, the processor determines that the operator satisfies the setting security level of the candidate.

7. The programmable display according to claim 1, wherein the security levels indicate hierarchy among operation authority of the operators of the programmable display and wherein the groups indicate types of jobs the operators are in charge of.

8. The programmable display according to claim 1, wherein types of jobs of the operators indicate which set of the plurality of apparatuses the operator is in charge of and screens and objects corresponding to said set of apparatuses.

9. The programmable display according to claim 1, wherein the programmable display functions as a user interface to instruct the control apparatus to control the plurality of apparatuses.

10. The programmable display according to claim 9, wherein the security levels indicate type of operations the operator is authorized to perform on the control apparatus and wherein the groups indicate targets of a job of the operator, which is a set of apparatuses selected from among the plurality of apparatuses that the operator is assigned to control via the user interface of the control apparatus.

11. The programmable display according to claim 1, wherein the groups indicate which targets selected from among the plurality of apparatuses are to be displayed by the display for the operator to control.

12. The programmable display according to claim 1, wherein the groups indicate various production lines comprising different ones of the plurality of apparatuses.

13. The programmable display according to claim 1, further comprising another communication interface configured to connect to a drawing apparatus which is operated by a user to generate the setting security level information and the setting security group information such that different hierarchical security levels are generated based on an operation authority assigned to the operators and different security groups are generated based on targets selected from the plurality of apparatuses the operators are responsible for.

* * * * *